United States Patent
Tonami et al.

(10) Patent No.: US 7,355,180 B2
(45) Date of Patent: Apr. 8, 2008

(54) RADIATION DETECTOR AND A METHOD OF MANUFACTURING THE DETECTOR

(75) Inventors: Hiromichi Tonami, Kyoto-fu (JP); Junichi Ooi, Kyoto-fu (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 11/882,795

(22) Filed: Aug. 6, 2007

(65) Prior Publication Data

US 2007/0290137 A1    Dec. 20, 2007

Related U.S. Application Data

(62) Division of application No. 11/072,411, filed on Mar. 7, 2005.

(30) Foreign Application Priority Data

Mar. 26, 2004  (JP)  ............................ 2004-092077

(51) Int. Cl.
*G01T 1/202*    (2006.01)
(52) U.S. Cl. .................................. 250/362
(58) Field of Classification Search ................ 250/362
See application file for complete search history.

(56) References Cited

U.S. PATENT DOCUMENTS

| 5,091,650 | A | 2/1992 | Uchida et al. |
| 5,455,849 | A | 10/1995 | Logan et al. |
| 5,712,483 | A | 1/1998 | Boone et al. |
| 6,298,113 | B1 | 10/2001 | Duclose et al. |
| 2004/0232342 | A1 | 11/2004 | Aykac et al. |
| 2004/0262527 | A1 | 12/2004 | Ooi |
| 2005/0017182 | A1 | 1/2005 | Joung et al. |
| 2005/0072930 | A1 | 4/2005 | Hoffoman et al. |
| 2005/0104000 | A1* | 5/2005 | Kindem et al. ......... 250/361 R |

FOREIGN PATENT DOCUMENTS

JP    06-095146 B2    11/1994

* cited by examiner

*Primary Examiner*—David Porta
*Assistant Examiner*—Marcus H Taningco
(74) *Attorney, Agent, or Firm*—Cheng Law Group PLLC (57) ABSTRACT

A scintillator array has a compact, two-dimensional arrangement of scintillators partitioned by light reflecting elements and light transmitting elements interposed between the scintillators. That is, the scintillator array has a lattice frame in the form of a crosswise combination of plate-like optical elements such as light reflecting elements and light transmitting elements. The lattice frame defines a plurality of cubicles. A transparent adhesive is poured into a rectangular vessel for receiving the lattice frame, the lattice frame is placed in the rectangular vessel, and then the scintillators are placed in the rectangular vessel. A cured resin object integrating the optical adhesive having cured, the lattice frame and the scintillators is removed from the vessel, and is contoured to make the scintillator array. In this way, the optical elements are arranged in the scintillator array without cutting them with a dicing saw or wire saw.

10 Claims, 9 Drawing Sheets

RADIATION DETECTOR AND A METHOD OF MANUFACTURING THE DETECTOR

CROSS-REFERENCE TO RELATED APPLICATION

The present application is a Divisional Application of the patent application Ser. No. 11/072,411, filed on Mar. 7, 2005, which is based on Japanese Priority No. 2004-092077, filed on Mar. 26, 2004, the entire contents of which are incorporated herein by reference.

BACKGROUND OF THE INVENTION (1) Field of the Invention

This invention relates to a radiation detector having scintillators, a light guide and photomultiplier tubes arranged in the stated order and optically combined to one another, and to a method of manufacturing the radiation detector.

(2) Description of the Related Art

This type of radiation detector is used in a medical diagnostic apparatus such a PET (Positron Emission Tomography) apparatus or a SPECT (Single Photon Emission Computed Tomography) apparatus for detecting radiation (e.g. gamma rays) released from radioisotopes (RI) introduced into a patient and accumulated in a region of interest, and obtaining sectional images of RI distribution in the region of interest. The radiation detector includes scintillators that emit light in response to incident gamma rays released from the patient, and photomultiplier tubes for converting the light emitted from the scintillators to pulsed electric signals. An earlier radiation detector had the scintillators and photomultiplier tubes arranged in a one-to-one relationship. In recent years, a technique has been employed to combine a plurality of scintillators to photomultiplier tubes smaller in number than the scintillators. With this technique, positions of incidence of gamma rays are determined from power ratios of the photomultiplier tubes to enhance resolution. A construction of a conventional radiation detector will be described hereinafter with reference to the drawings.

Figure 1:
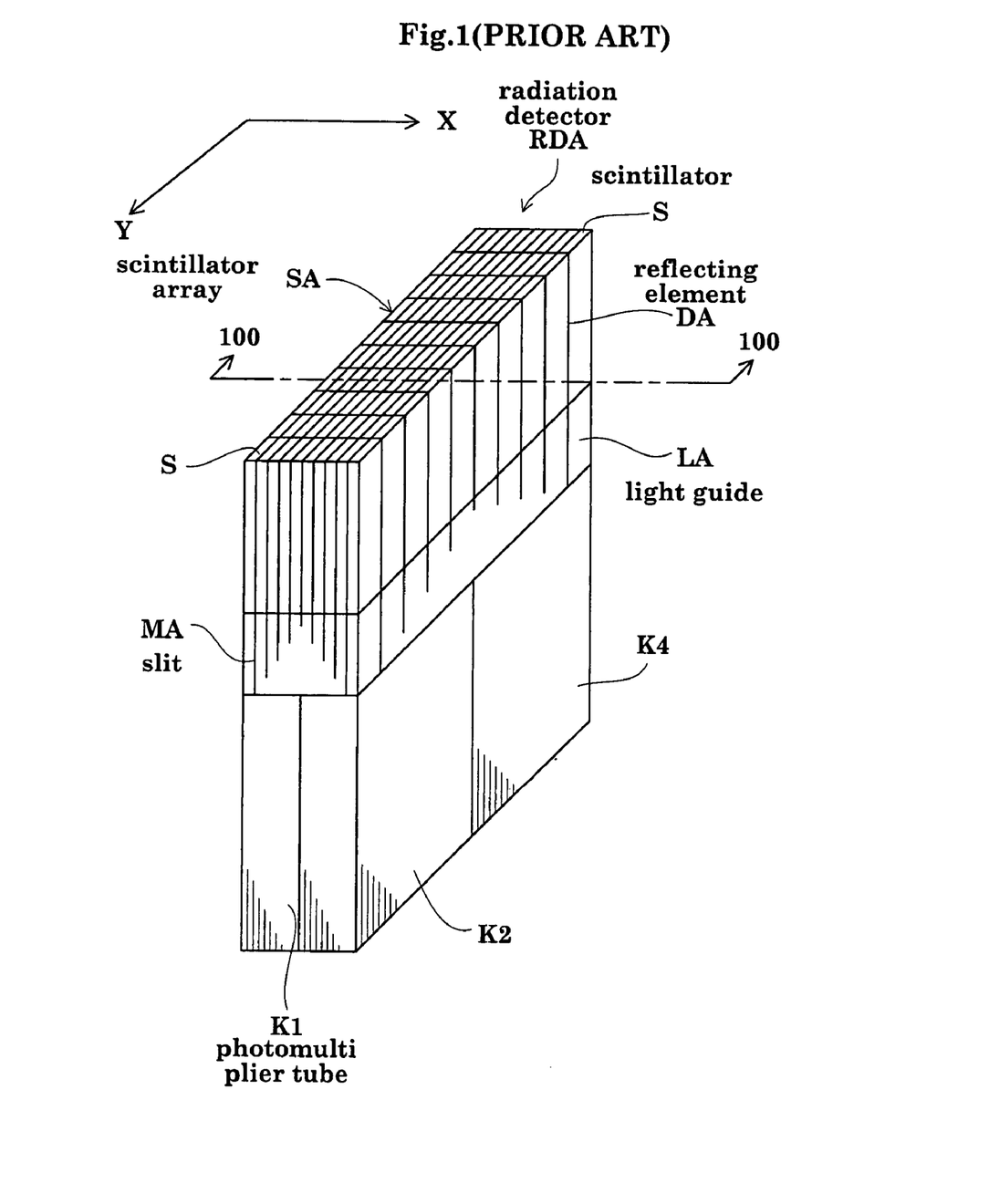
FIG. 1 is a view showing an outward appearance of a conventional radiation detector.
Figure 2:
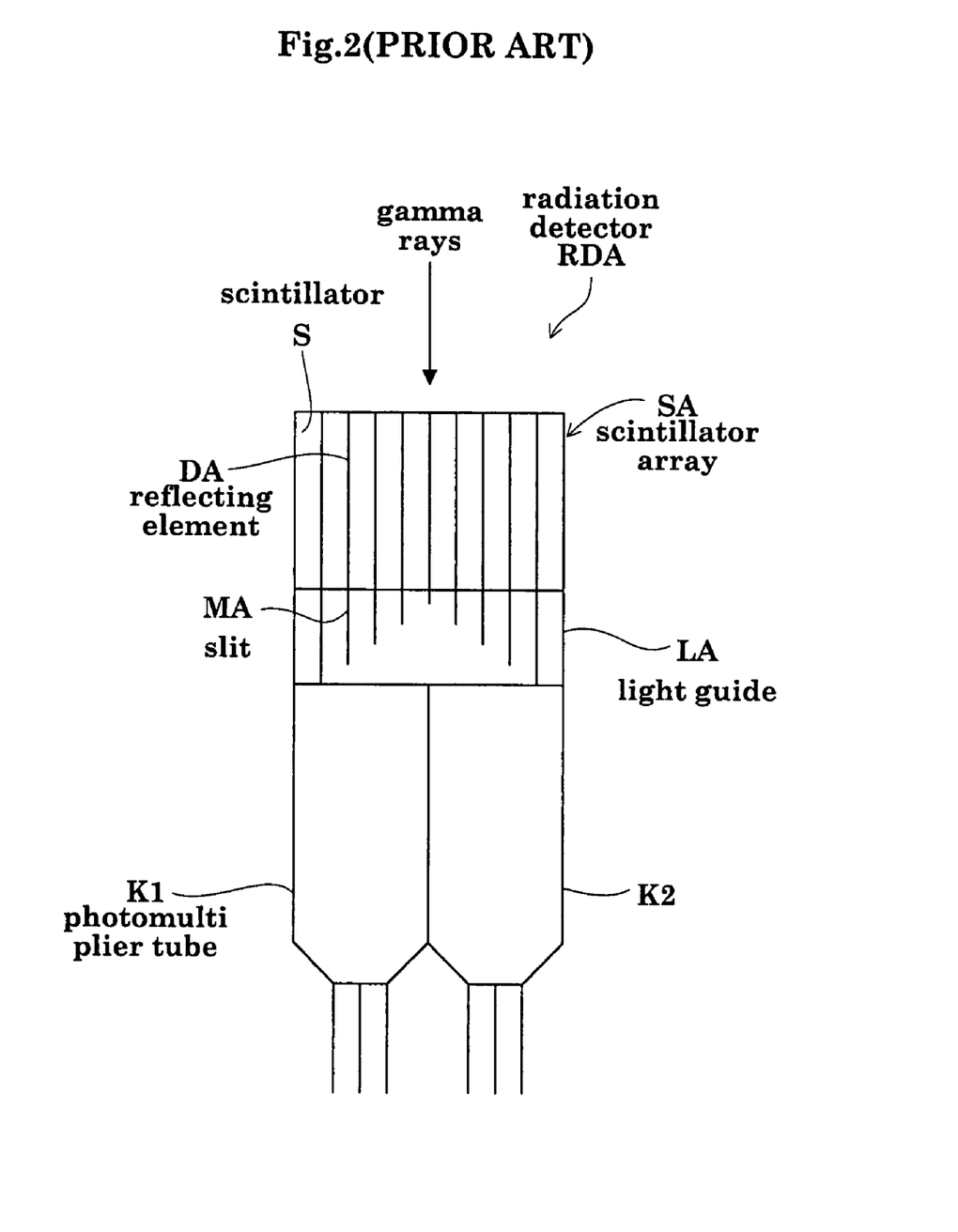
FIG. 2 is a section of the conventional radiation detector taken on line 100-100 of FIG. 1.

FIG. 1 is a schematic view showing an outward appearance of a conventional radiation detector. FIG. 2 is a section taken on line 100-100 of FIG. 1. FIGS. 1 and 2 show an example disclosed in Japanese Patent Publication No. 06-95146 (1994). This radiation detector RDA includes a scintillator array SA, a light guide LA optically combined to the scintillator array SA, a plurality of (four in FIGS. 1 and 2) photomultiplier tubes K1, K2, K3 (not seen in the figures) and K4 optically combined to the light guide LA. The scintillator array SA is an aggregate of scintillators S divided by numerous light reflecting elements DA inserted peripherally thereof. The scintillator array SA may be surrounded by light reflectors (not shown).

With this radiation detector RDA, the light guide LA is formed of an optically transparent material defining numerous slits MA of predetermined depths cut by a dicing saw or wire saw. The slits MA have optical elements (e.g. light reflecting elements or light transmitting elements) inserted therein. The slits MA have larger lengths from inner to outer positions of the light guide LA. This construction adjusts quantities of light from the scintillators S distributed to the four photomultiplier tubes K1-K4 to discriminate positions of incidence of gamma rays.

The conventional radiation detector RDA noted above has the following drawbacks.

The radiation detector RDA is a high-resolution detector using the scintillators S of high sensitivity as proposed in recent years, and the scintillator array SA has far more scintillators than the scintillator array of an earlier detector. Consequently, each scintillator S has a smaller section than a scintillator in the earlier detector. Generally, the smaller scintillators S provide, by absorption or diffusion, the lower probability of photons produced inside moving into the light guide LA. This reduces the capability of discriminating, and thus detecting, positions of incidence of gamma rays.

Where the scintillator array SA is designed such that individual scintillators S surrounded by numerous light reflecting elements DA, great numbers of scintillators S and light reflecting elements DA are required. This will results in a complicated manufacturing process, and thus high cost.

When suitable light reflecting elements DA are inserted in the slits MA after a shaping process, gaps are formed between the reflecting elements DA and slits MA, thereby lowering reflection efficiency also. As these factors reduce output by incident gamma rays to make an accurate discrimination of positions impossible, an overall image quality will also deteriorate.

More particularly, a reduced discriminating ability results in a reduction in resolution. Where such radiation detector RDA is used in a medical diagnostic apparatus such as a PET apparatus or SPECT apparatus, images obtained by the apparatus will have poor quality. When a region of interest is a tumor, for example, the tumor may not be accurately outputted on the image.

Further, the light reflecting elements DA or light transmitting elements inserted or filled as optical elements between the scintillator S make an accurate discrimination of positions even more difficult, particularly where light transmitting elements are used. That is, it is common practice to use a highly transmissive optical adhesive to form the light transmitting elements. However, since the optical adhesive forms adhesive layers, it is difficult to control the thickness of the light transmitting elements. As a result, variations will occur in the thickness of the light transmitting elements, so that the scintillators are not arranged at equal intervals. This further encumbers an accurate discrimination of positions of gamma ray incidence.

SUMMARY OF THE INVENTION

This invention has been made having regard to the state of the art noted above, and its object is to provide a radiation detector, and a method of manufacturing the radiation detector, capable of maintaining high image quality with high resolution, which may be realized simply.

The above object is fulfilled, according to this invention, by a radiation detector having a scintillator array formed of a plurality of scintillators in a compact, two-dimensional arrangement, a light guide optically combined to the scintillator array, and a plurality of photomultiplier tubes smaller in number than the scintillators and optically combined to the light guide, wherein the scintillator array is formed of at least the scintillators and a lattice frame having plate-like optical elements combined crosswise, the lattice frame defining a plurality of cubicles.

With the radiation detector according to this invention, when radiation impinges on one scintillator, in one of the cubicles defined by the optical elements, in the scintillator array having a plurality of scintillators in a compact, two-dimensional arrangement, that scintillator will absorb the radiation and emit light. Part of this light is transmitted through adjacent scintillators, but a major part of the light enters the light guide while repeating passage and dispersion due to reflections inside the scintillator. The light incident on the light guide is dispersed inside the light guide, and enters the photomultiplier tubes.

It is relatively easy to prepare the lattice frame as designed, and therefore the cubicles in this lattice frame are also easy to form as designed. The scintillators in the respective cubicles are also easy to form as designed. This results in a reduced chance of gaps being formed between the scintillators and optical elements interposed between the scintillators. Thus, the discriminating ability is improved to maintain high resolution and high image quality.

In the above radiation detector according to this invention, where the optical elements are light transmitting elements interposed between the scintillators, it is preferred that the light transmitting elements are formed of positioning elements arranged at equal intervals at least on a plane of the scintillator array opposed to the light guide, and an optical adhesive for transmitting light, the positioning elements being positioning reflecting elements or positioning transparent films.

With the positioning elements arranged at equal intervals, the light transmitting elements are arranged at equal intervals at least on the plane of the scintillator array opposed to the light guide. With the aid of the positioning elements, the scintillators are arranged at equal intervals on the plane of the scintillator array opposed to the light guide. This further promotes the discriminating ability.

The positioning elements may be arranged at least on the plane of the scintillator array opposed to the light guide. Thus, the positioning elements may be arranged only on the plane of the scintillator array opposed to the light guide, and also on the plane of the scintillator array remote from the light guide.

Where the light transmitting elements are formed of positioning elements and an optical adhesive, it is desirable to provide the positioning elements in a way to present no obstruction to the transmission of light. Specifically, it is preferred that the positioning elements have an overall total area at most a quarter of a total area of the light transmitting elements. Still more desirably, the overall total area of the positioning elements is at most one tenth of the total area of the light transmitting elements.

In another aspect of the invention, there is provided a method of manufacturing a radiation detector having a scintillator array formed of a plurality of scintillators in a compact, two-dimensional arrangement, a light guide optically combined to the scintillator array, and a plurality of photomultiplier tubes smaller in number than the scintillators and optically combined to the light guide, the method comprising:

(A) a step of fabricating a lattice frame by combining a plurality of plate-like optical elements crosswise;

(B) a step of pouring a transparent liquid resin into a rectangular vessel for receiving the lattice frame, before or after placing the lattice frame in the rectangular vessel;

(C) a step of placing the scintillators in the rectangular vessel after placing the lattice frame in the rectangular vessel and pouring the liquid resin into a rectangular vessel; and (D) a step of removing from the rectangular vessel a cured resin object integrating the liquid resin having cured, the lattice frame and the scintillators, and contouring the resin object to make the scintillator array;

the steps (A)-(D) being executed to manufacture the scintillator array.

With the method of manufacturing a radiation detector according to this invention, the optical elements may be arranged in the scintillator array through the steps (A) to (D), without being cut with a dicing saw or wire saw. This realizes a radiation detector with high finishing accuracy. The radiation detector is manufactured simply through the steps (A) to (D).

In the above radiation detector manufacturing method, it is preferred that a release agent is applied to the rectangular vessel before executing the step (B) of pouring the transparent liquid resin into the rectangular vessel. Then, when executing the step (D), i.e. removing from the rectangular vessel a cured resin object integrating the liquid resin having cured, the lattice frame and the scintillators, and contouring the resin object to make the scintillator array, the resin object may be removed from the rectangular vessel easily.

Preferably, the liquid resin is defoamed when executing the step (B) of pouring the transparent liquid resin into the rectangular vessel. By defoaming the liquid resin, the cured resin becomes free from voids formed therein, thus avoiding lowering of resolution due to such voids. As a defoaming method, the liquid resin may be poured in after being defoamed, or the liquid resin may be poured in while carrying out vacuum degassing, after placing the rectangular vessel in a space that may be vacuum-degassed.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

A preferred embodiment of this invention will be described in detail hereinafter with reference to the drawings.

Figure 3:
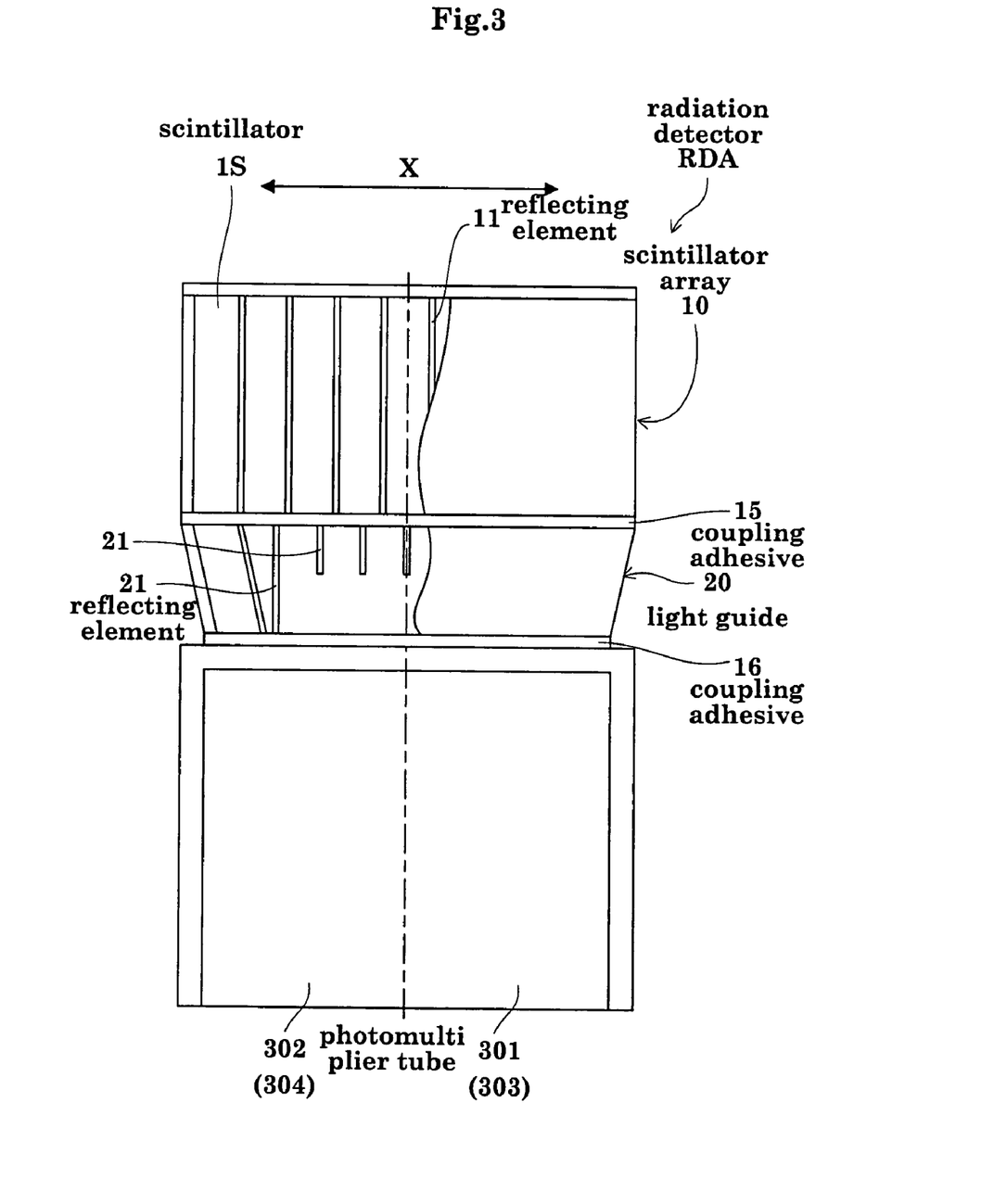
FIG. 3 is a view showing an outward appearance, in an X-direction seen from a Y-direction, of a radiation detector in one embodiment of this invention.
Figure 4:
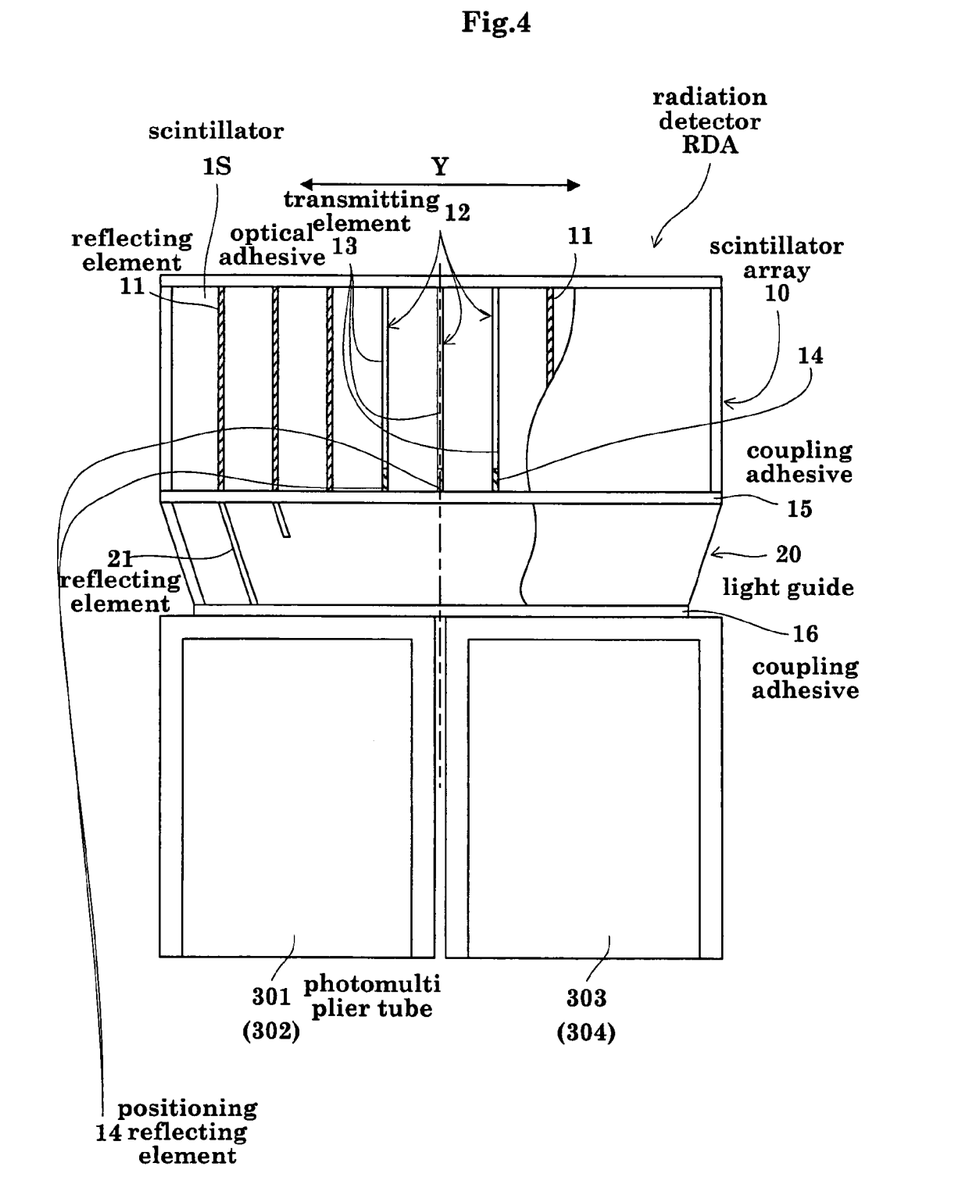
FIG. 4 is a view showing an outward appearance, in the Y-direction seen from the X-direction, of the radiation detector.

FIG. 3 is a view (side view) showing an outward appearance, in an X-direction seen from a Y-direction, of a radiation detector in one embodiment of this invention. FIG. 4 is a view (front view) showing an outward appearance, in the Y-direction seen from the X-direction, of the radiation detector;

The radiation detector RDA in this embodiment includes a scintillator array 10, a light guide 20 optically combined to the scintillator array 10, and four photomultiplier tubes 301, 302, 303 and 304 optically combined to the light guide 20. FIG. 3 shows the photomultiplier tube 301 and photomultiplier tube 302. FIG. 4 shows the photomultiplier tube 301 and photomultiplier tube 303.

The scintillator array 10 has scintillators 1S in a compact, two-dimensional arrangement, the scintillators 1S being defined by light reflecting elements 11 and light transmitting elements 12. In this embodiment, 90 scintillators 1S in total are arranged two-dimensionally, with nine arranged in the X-direction and ten in the Y-direction. The light guide 20 has a lattice frame (not shown) with strips (not shown) of optical elements such as light reflecting elements 21 combined crosswise. This lattice frame defines numerous cubicles. The scintillators 1S are formed of an inorganic crystal such as $Bi_4Ge_3O_{12}$ (BGO), $Gd_2SiO_5$ (GSO), $Lu_2SiO_5$:Ce ($Lu_2SiO_5$ doped with Ce, i.e. LSO), $LuYSiO_5$:Ce ($LuYSiO_5$ doped with Ce, i.e. LYSO), NaI (sodium iodide), $BaF_2$ (barium fluoride) or CsF (cesium fluoride).

Figure 8:
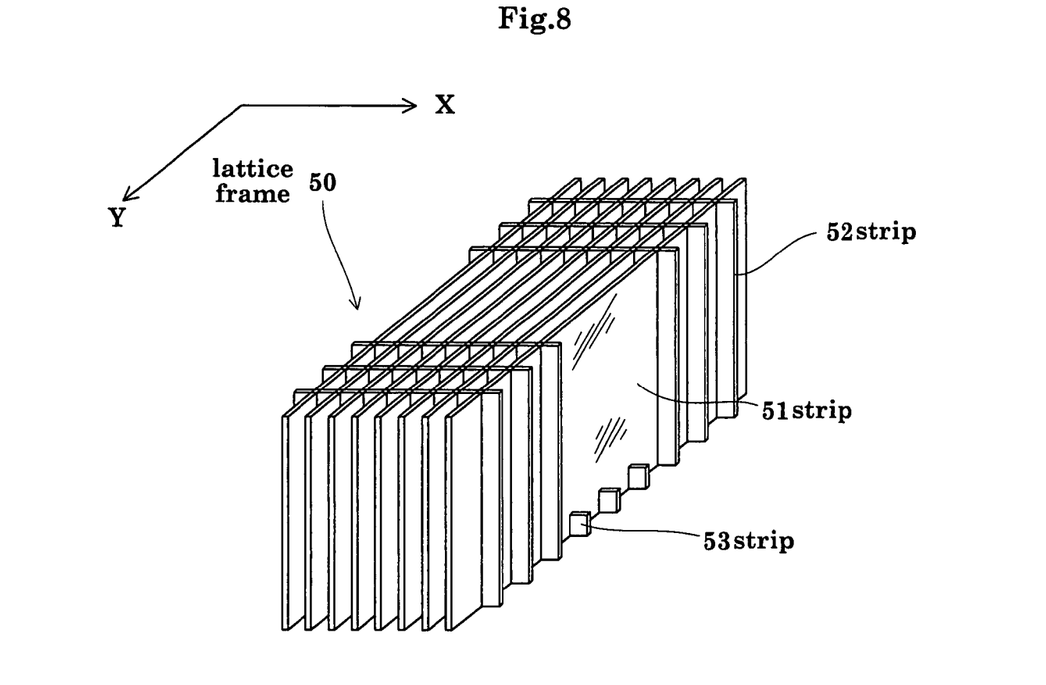
FIG. 8 is a perspective view of a lattice frame of a scintillator array.

In this embodiment, light reflecting elements 11 are interposed between all the scintillators 1S arranged in the X-direction. With the ten scintillators 1S arranged in the Y-direction, light transmitting elements 12 are interposed between the four scintillators 1S in the middle, and light reflecting elements 11 between the other scintillators 1S. That is, as does the light guide 20 described above, the scintillator array 10 also has a lattice frame 50 with strips 51-53 of optical elements such as light reflecting elements 11 and light transmitting elements 12 (FIG. 8). This lattice frame 50 defines numerous cubicles.

As shown in FIG. 3, when gamma rays impinge on the nine scintillators 1S arranged in the X-direction, the scintillators 1S absorb the gamma rays and emit light. Specifically, the gamma rays are converted to visible light. This light is led to the photomultiplier tubes 301-304 through the light guide 20 combined optically. The positions, lengths and angles of the respective light reflecting elements 21 in the light guide 20 are adjusted so that the photomultiplier tube 301 (303) and photomultiplier tube 302 (304) arranged in the X-direction have a power ratio varying at a predetermined rate.

More particularly, the lengths of the light reflecting elements 21 and intervals between the reflecting elements 21 are adjusted to predetermined intervals and angles relative to the direction of arrangement of the scintillator array 10 so that a calculation (P1−P2)/(P1+P2), where P1 is the output of photomultiplier tube 301 and P2 is the output of photomultiplier tube 302, changes at a predetermined rate according to the position of each scintillator 1S. The longer reflecting elements 21 result in the higher discriminating ability of the scintillators 1S, but also in the greater attenuation of light. The discriminating ability is improved without reducing the quantity of light only by slightly changing the positions, angles and lengths.

On the other hand, as shown in FIG. 4, the ten scintillators 1S arranged in the Y-direction, as do the scintillators 1S arranged in the X-direction, emit light which is led to the photomultiplier tubes 301-304 through the light guide 20 optically combined. The positions, lengths and angles of the respective light reflecting elements 21 in the light guide 20 are adjusted so that the photomultiplier tube 301 (302) and photomultiplier tube 303 (304) arranged in the Y-direction have a power ratio varying at a predetermined rate.

A coupling adhesive 15 is interposed between the scintillator array 10 and light guide 20. A coupling adhesive 16 is interposed between the light guide 20 and photomultiplier tubes 301-304. These adhesives 15 and 16 optically combine the scintillator array 10 and light guide 20, and the light guide 20 and photomultiplier tubes 301-304, respectively.

As described above, light transmitting elements 12 are interposed between the four scintillators 1S in the middle of the ten scintillators 1S arranged in the Y-direction. It is common practice to use a highly transmissive optical adhesive to form the light transmitting elements 12 in accordance with the light emitting wavelength characteristic of the scintillators. Transparent film would attenuate light and weaken its output. As a result, it would be impossible to discriminate positions of incidence of gamma rays accurately.

Figure 5:
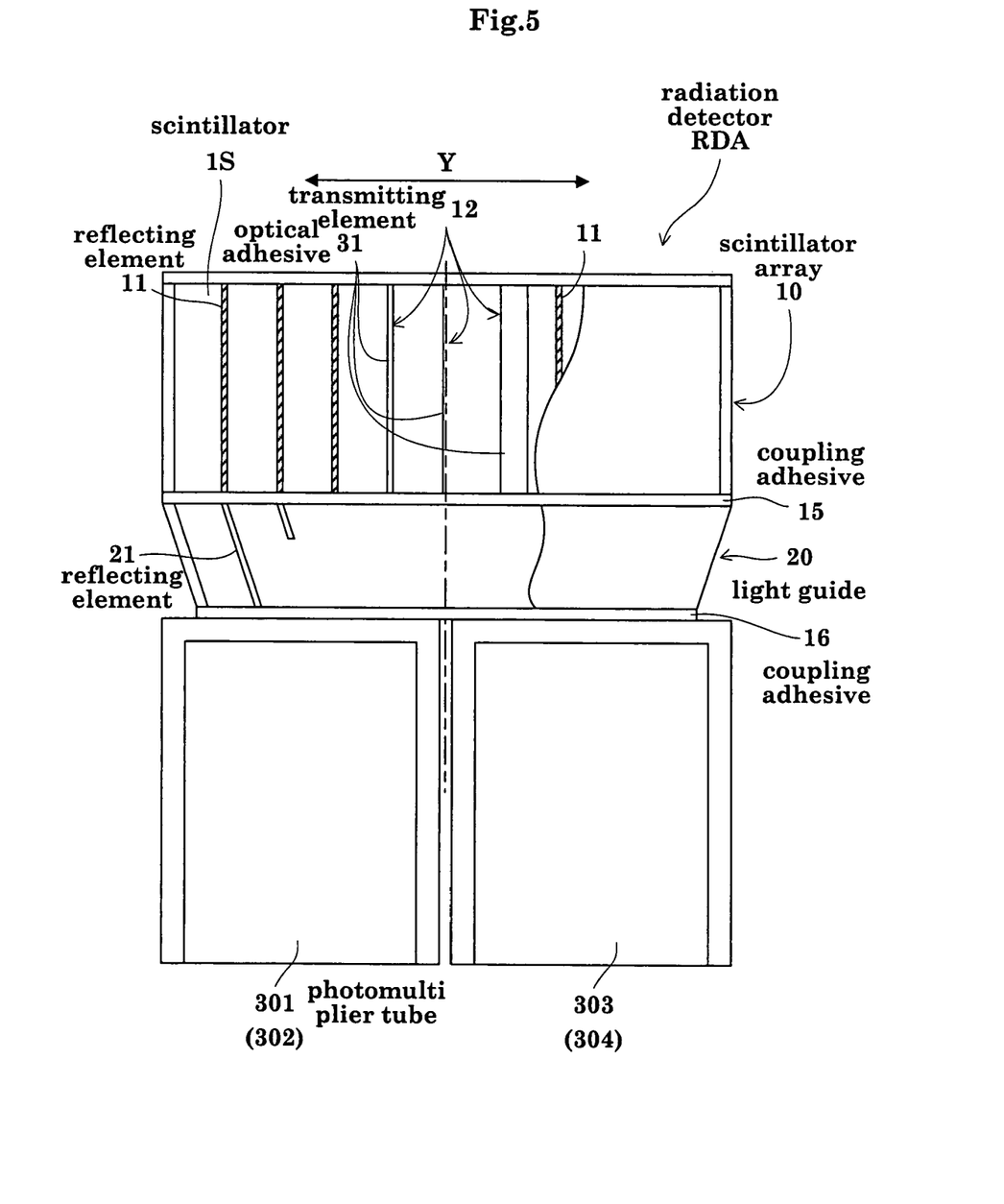
FIG. 5 is a view showing an outward appearance, in the Y-direction seen from the X-direction, of the radiation detector in which light transmitting elements are formed of an optical adhesive only.

However, only an optical adhesive is used to form the light transmitting elements 12, since the optical adhesive forms adhesive layers, it is difficult to control the thickness of the light transmitting elements 12. As a result, as shown in FIG. 5, variations occur in the thickness of the light transmitting elements 12, so that the scintillators 1S are not arranged at equal intervals. In the example shown in FIG. 5, the light transmitting element 12 at the right-hand end is formed of a thicker optical adhesive 31 than the other light transmitting elements 12, resulting in unequal intervals between the scintillators 1S. It is impossible to discriminate positions of incidence of gamma rays accurately unless the scintillators 1S are arranged at equal intervals particularly on the plane of the scintillator array 10 opposed to the light guide 20, i.e. the coupling plane between the scintillator array 10 and light guide 20.

This embodiment therefore uses, in the portions of light transmitting elements 12, a highly transmissive optical adhesive 13 and positioning reflecting elements 14 arranged at equal intervals on the plane of the scintillator array 10 opposed to the light guide 20. The positioning reflecting elements 14 have the same thickness as the light reflecting elements 11. It is desirable that the positioning reflecting elements 14 are formed of the same material and quality as the light reflecting elements 11 from the viewpoint of manufacturing cost and structural simplicity. The positioning reflecting elements 14 correspond to the positioning light reflecting elements in this invention, and also to the positioning members in this invention.

The light transmitting elements 12 are formed of the optical adhesive 13 and positioning reflecting elements 14, with the positioning reflecting elements 14 arranged at equal intervals. Thus, the light transmitting elements 12 are arranged at equal intervals on the plane of the scintillator array 10 opposed to the light guide 20. With the aid of the positioning reflecting elements 14, the scintillators 1S are arranged at equal intervals on the plane of the scintillator array 10 opposed to the light guide 20, thereby promoting the discriminating ability.

It is desirable to provide the positioning reflecting elements 14 in a way to present no obstruction to the transmission of light. Specifically, it is desirable that the positioning reflecting elements 14 have an overall total area not exceeding a quarter of the total area of the light transmitting elements 12. It is more desirable that the positioning reflecting elements 14 have an overall total area not exceeding one tenth of the total area of the light transmitting elements 12.

As a modification of the positioning members, transparent film may be used instead of the positioning light reflecting elements (positioning reflecting elements 14). Although transparent film attenuates light and weakens its output light, the transparent film will serve the purpose as long as its area does not obstruct the transmission of light, as in the case of the positioning reflecting elements 14. That is, the transparent film should have an overall total area not exceeding a quarter, and preferably not exceeding one tenth, of the total area of the light transmitting elements 12. The transparent film corresponds to the positioning transparent films in this invention, and also to the positioning elements in this invention.

Figure 6:
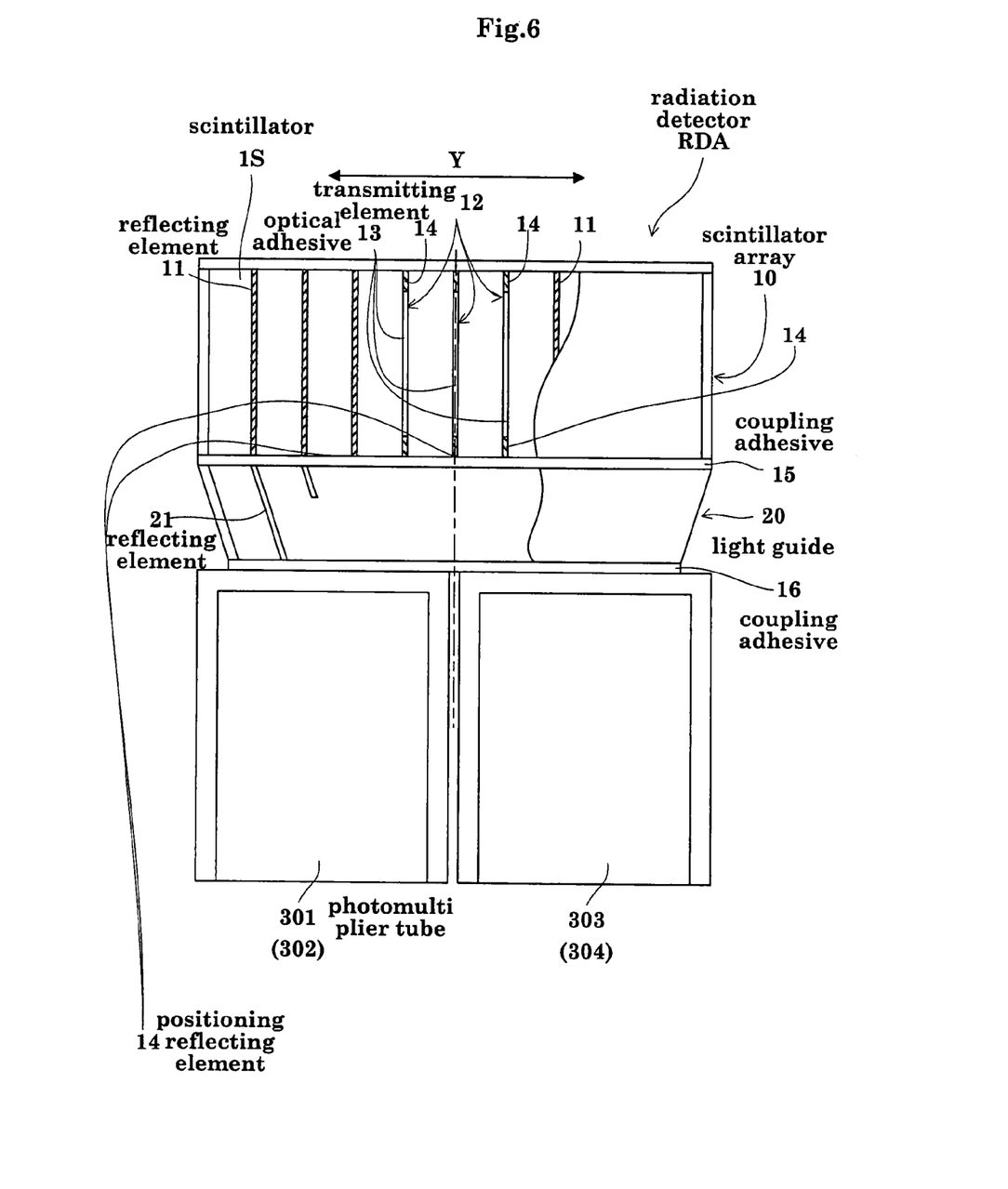
FIG. 6 is a view showing an outward appearance, in the Y-direction seen from the X-direction, of a modified radiation detector.

As a modified arrangement of the positioning reflecting elements 14, as shown in FIG. 6, the portions of light transmitting elements 12 have positioning reflecting elements 14 of the same thickness as the light reflecting elements 11 are arranged on the plane of the scintillator array 10 opposed to the light guide 20 (i.e. the cutting plane between the scintillator array 10 and light guide 20), and also on the plane of the scintillator array 10 remote from the light guide 20. The optical adhesive 13 is interposed between the positioning reflecting elements 14 arranged on the two opposite planes.

With the positioning reflecting elements 14 arranged also on the plane of the scintillator array 10 remote from the light guide 20, the scintillators 1S are arranged, with increased precision, at equal intervals on the plane of the scintillator array 10 remote from the light guide 20 as well as on the plane of the scintillator array 10 opposed to the light guide 20.

In this case also, the positioning reflecting elements 14 should be arranged in a way to present no obstruction to the transmission of light. The positioning reflecting elements 14 arranged on the opposite surfaces should have an overall total area not exceeding a quarter, and preferably not exceeding one tenth, of the total area of the light transmitting elements 12. In this case also, transparent film may be used instead of the positioning reflecting elements 14.

As described above, where the light transmitting elements 12 are formed of the optical adhesive, and positioning members such as the positioning reflecting elements 14 or transparent films, the positioning members should be arranged at equal intervals at least on the plane of the scintillator array 10 opposed to the light guide 20.

Figure 7:
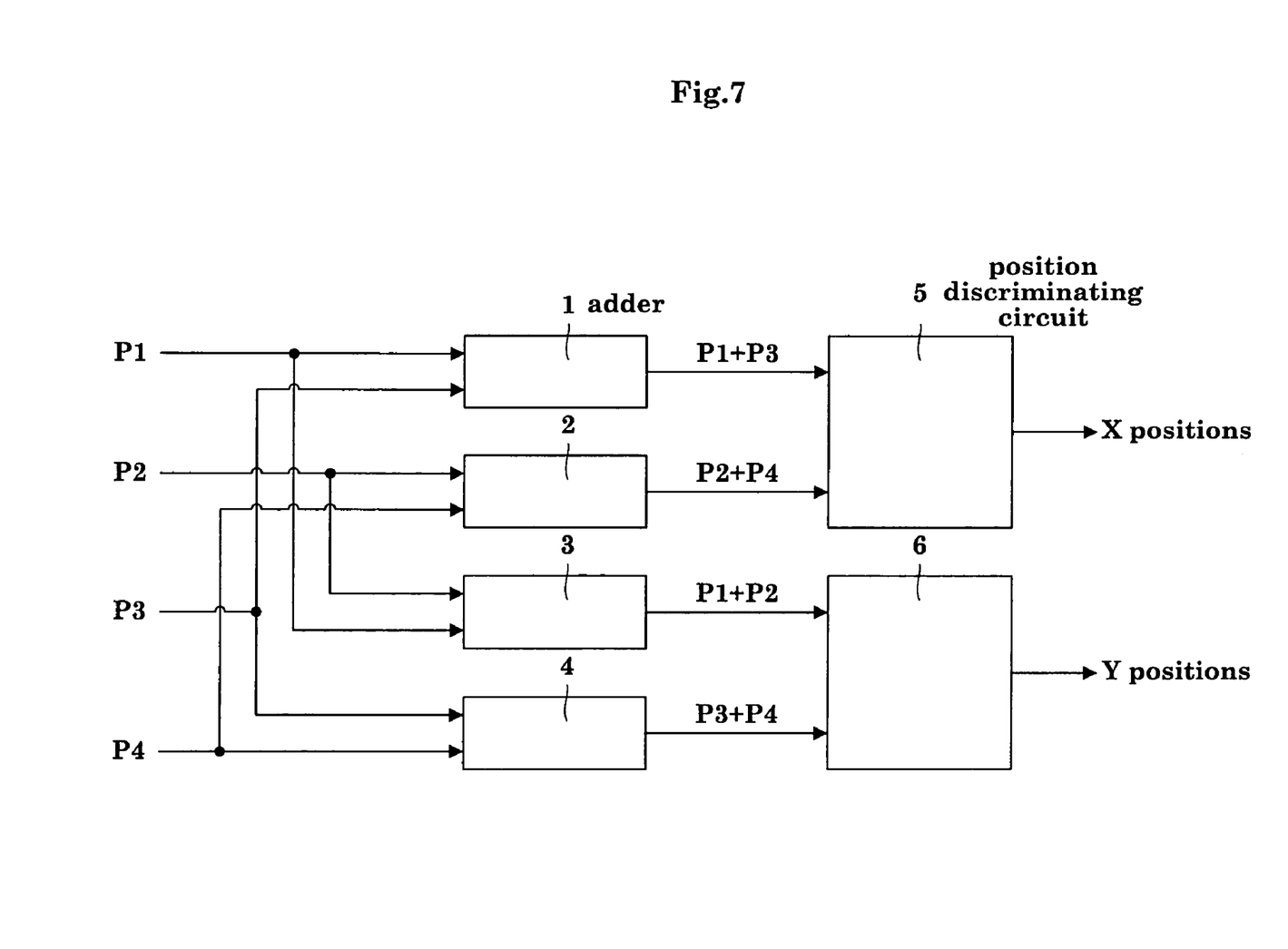
FIG. 7 is a block diagram showing a position calculating circuitry of the radiation detector.

FIG. 7 is a block diagram showing a position calculating circuitry of the radiation detector. The position calculating circuitry includes adders 1, 2, 3 and 4, and position discriminating circuits 5 and 6. Referring to FIG. 7, in order to detect positions of incidence of gamma rays in the X-direction, output P1 of the photomultiplier tube 301 and output P3 of the photomultiplier tube 303 are inputted to the adder 1, and output P2 of the photomultiplier tube 302 and output P4 of the photomultiplier tube 304 are inputted to the adder 2. Added outputs (P1+P3) and (P2+P4) of the two adders 1 and 2 are inputted to the position discriminating circuit 5, and positions of incidence of gamma rays in the X-direction are determined from the two added outputs.

Similarly, in order to detect positions of incidence of gamma rays in the Y-direction, output P1 of the photomultiplier tube 301 and output P2 of the photomultiplier tube 302 are inputted to the adder 3, and output P3 of the photomultiplier tube 303 and output P4 of the photomultiplier tube 304 are inputted to the adder 4. Added outputs (P1+P2) and (P3+P4) of the two adders 3 and 4 are inputted to the position discriminating circuit 6, and positions of incidence of gamma rays in the Y-direction are determined from the two added outputs.

Next, a specific construction of the scintillator array 10 will be described with reference to FIG. 8. FIG. 8 is a perspective view of the lattice frame of the scintillator array 10. The scintillator array 10 is formed mainly of a transparent material with the lattice frame 50 laid therein as shown in FIG. 8. The scintillators 1S are arranged in the cubicles formed by the lattice frame 50, respectively. The lattice frame 50 is formed by combining optical elements such as the light reflecting elements 11 and light transmitting elements 12 (i.e. strips 51-53).

The light reflecting elements 11 between the scintillators 1S, and the light reflecting elements 21 of the light guide 20, are formed of polyester film having a multi-layer structure of silicon oxide and titanium oxide, polished aluminum, a thin substrate coated with titanium oxide or barium sulfate, a thin substrate covered by white tape, or a thin smooth substrate with aluminum formed thereon by vapor deposition.

Figure 9:
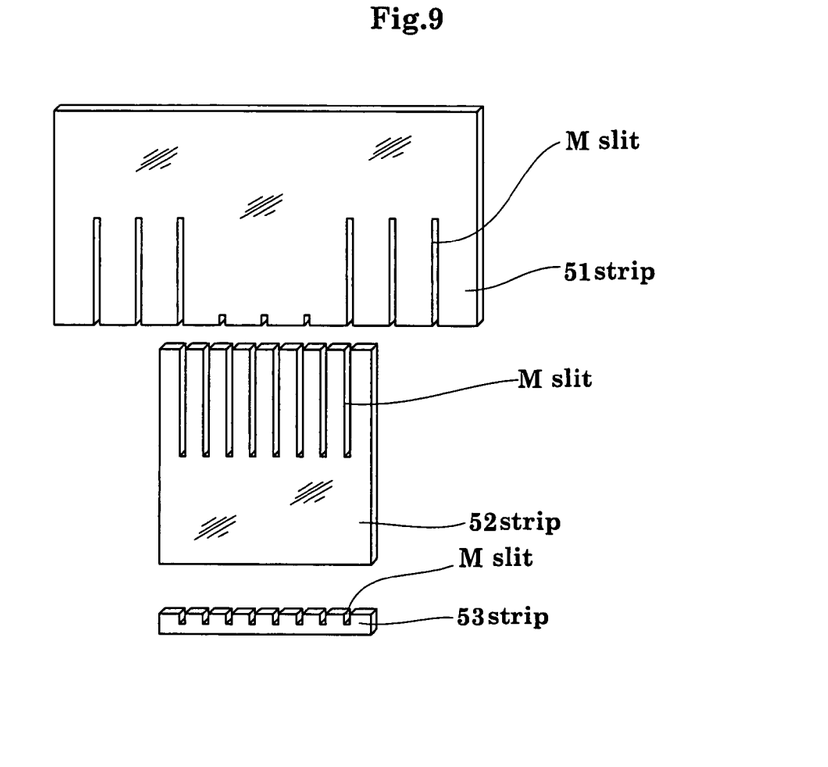
FIG. 9 is an exploded perspective view showing optical elements constituting the lattice frame.

Next, a method of manufacturing the scintillator array 10 will be described with reference to FIG. 9. FIG. 9 is an exploded perspective view showing the optical elements constituting the lattice frame. The optical elements comprise the above light reflecting elements or transparent film, or a combination thereof As shown in FIG. 9, the optical elements are in the form of thin strips 51-53 each defining slits M therein. The optical elements are combined by means of the slits M to form the lattice frame 50. The strips 53 correspond to the positioning reflecting elements 14 shown in FIG. 4. The fabrication of the lattice frame 50 corresponds to step (A) in this invention.

The strips 51-53 may be contoured by dicing, laser cutting, cutting with a cutting tool, etching or punching. The strips 51-53, because they are thin, may be cut easily and precisely.

Figure 10:
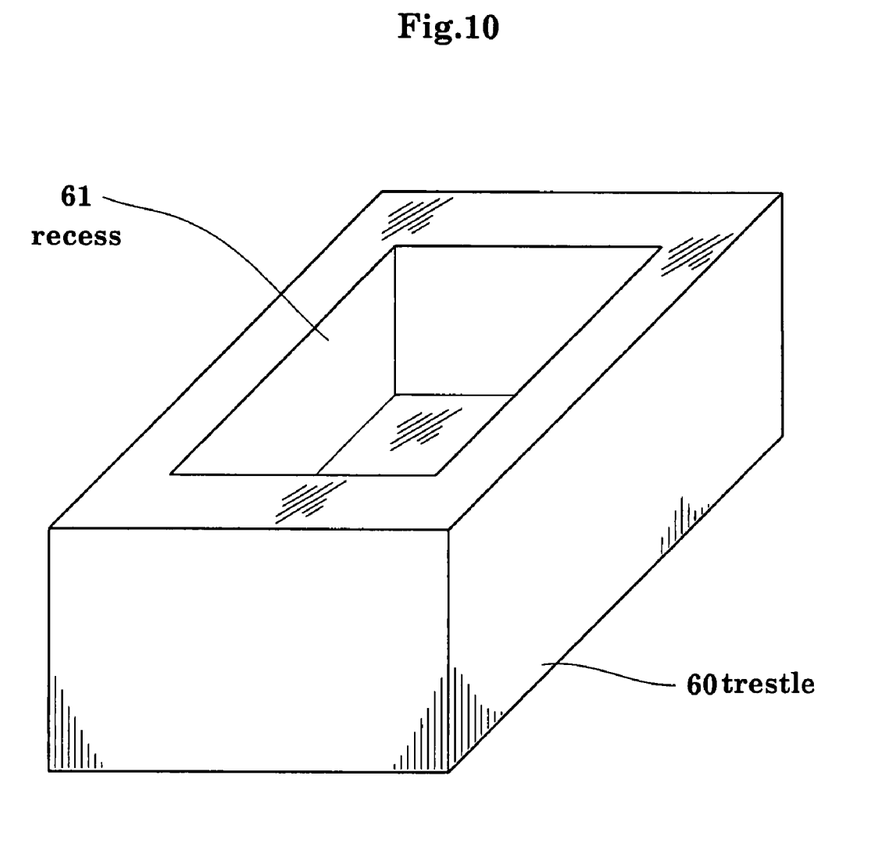
FIG. 10 is a perspective view of a trestle for use in manufacture of the radiation detector.

Next, a method of manufacturing the radiation detector using this scintillator array 10 will be described with reference to FIGS. 8 through 10. FIG. 10 is a perspective view of a trestle for use in manufacture of the radiation detector. In manufacture, as shown in FIG. 10, a rectangular trestle 60 is prepared, which has a recess 61 for receiving the lattice frame 50 therein. The lattice frame 50 shown in FIG. 8 is placed in the recess 61 of the trestle 60. The recess 61 has an area and depth for completely surrounding the lattice frame 50. A release agent is applied to inner surfaces of the recess 61 beforehand for allowing the scintillator array as a finished product (not shown) to be removed easily from the recess 61. The trestle 60 corresponds to the rectangular vessel in this invention. Preferably, the trestle 60 is formed of fluororesin which has excellent release action, or is formed of metal such as aluminum or stainless steel and has surfaces coated with fluororesin.

A thoroughly defoamed, optically transparent optical adhesive is poured as liquid resin into the recess 61 of the trestle 60. Before the optical adhesive poured cures, the lattice frame 50 is placed in the trestle 60, and then the scintillators 1S are arranged in place.

Although the optical adhesive may overflow the trestle 60 in time of arranging the scintillators 1S, the arranging operation may be carried out while wiping off the overflows from time to time. After all the scintillators 1S are arranged in place, the transparent optical adhesive is further applied in drips from above. Then, a vacuum degassing operation is carried out so that the optical adhesive dripped completely fills the spaces between the scintillators 1S and lattice frame 50 and the spaces between the scintillators 1S. At this time, the optical adhesive elements 13 shown in FIG. 4 are formed also. After the optical adhesive cures, the lattice frame 50 and optical adhesive are integrated as a cured resin object.

The object is removed, and contoured by cutting and polishing to make the scintillator array 10 as shown in FIGS. 3 and 4. The pouring of the optical adhesive corresponds to step (B) in this invention. The process up to the arranging of the scintillators 1S corresponds to step (C) in this invention. The process up to the contouring corresponds to step (D) in this invention. The optical adhesive, preferably, is a silicone adhesive or epoxy adhesive.

By pouring in the defoamed optical adhesive, the cured resin becomes free of voids which would lower resolution. A method of defoaming is not limited to the time of pouring in of the defoamed optical adhesive. After placing the trestle 60 in a space (e.g. a chamber) that may be vacuum-degassed, the optical adhesive may be poured in while carrying out vacuum degassing. In the above example, after pouring in the optical adhesive and before the adhesive cures, the lattice frame 50 is placed in the recess 61 of the trestle 60. Instead, after the lattice frame 50 is placed in the recess 61 of the trestle 60, the optical adhesive may be poured in and allowed to cure.

The scintillator array 10 manufactured as described above is optically combined with the light guide 20 by the coupling adhesive 15 shown in FIGS. 3 and 4. The optically combined scintillator array 10 and light guide 20 are optically combined with the photomultiplier tubes 301-304 by the coupling adhesive 16 shown in FIGS. 3 and 4, to form the radiation detector RDA. Thus, the radiation detector RDA of high resolution may be realized simply. The above manufacturing method assures a high degree of shaping accuracy even where the scintillators 1S have a small sectional area, for example. A thickness and angles of the light reflecting elements 11 may be selected freely, and the transparent optical adhesive fills the spaces between the scintillators 1S and light reflecting elements 11 and the spaces between the scintillators 1S, thereby assuring high reflecting efficiency. Besides, the number of components may be minimized. The optical elements may be arranged in the scintillator array 10 without cutting them with a dicing saw or wire saw, thereby realizing the radiation detector 20 with high finishing accuracy.

It is relatively easy to prepare the lattice frame 50 as designed, and therefore the cubicles in this lattice frame 50 are also easy to form as designed. The scintillators 1S in the respective cubicles are also easy to form as designed. This results in a reduced chance of gaps being formed between the scintillators 1S and the light reflecting elements 11 or light transmitting elements 12 interposed between the scintillators 1S. Thus, the discriminating ability is improved to maintain high resolution and high image quality.

As described hereinbefore, the light transmitting elements 12 are formed of the optical adhesive 13 and positioning reflecting elements 14, with the positioning reflecting elements 14 arranged at equal intervals. With the aid of the positioning reflecting elements 14, the scintillators 1S are arranged at equal intervals on the plane of the scintillator array 10 opposed to the light guide 20. This further promotes the discriminating ability.

Where the radiation detector RDA of high resolution and high image quality is used in a diagnostic apparatus such as a PET apparatus or SPECT apparatus, images of high quality may be obtained from the apparatus also. Where, for example, a region of interest has a tumor, the tumor may be outputted on the images easily and accurately. The scintillators 1S arranged at intervals of 2.5 mm allow an accurate output of a tumor with a diameter of about 3.0 mm in the center of a visual field.

This invention is not limited to the above embodiment, but may be modified as follows:

(1) In the foregoing embodiment, the radiation detector is constructed for detecting gamma rays. The invention is applicable also to a detector for detecting radiation other than gamma rays, e.g. X rays.

(2) In the foregoing embodiment, the light reflecting elements 11 and light transmitting elements 12 are used as the optical elements forming the scintillator array 10. Instead, only the light reflecting elements 11 may be used as the optical elements. Where the light transmitting elements 12 are not used, it is not absolutely necessary to form the light transmitting elements 12 of positioning elements and optical adhesive.

(3) In the foregoing embodiment, the liquid resin is poured in after a release agent is applied to facilitate removal of the scintillator array as a finished product from the trestle 60. It is not absolutely necessary to apply the release agent.

(4) In the foregoing embodiment, the optical adhesive is poured in as liquid resin. The scintillator array 10 may be manufactured by pouring in a liquid resin other than the optical adhesive.

(5) In the foregoing embodiment, the transparent optical adhesive is applied in drips from above the trestle 60, so that the optical adhesive dripped completely fills the spaces between the scintillators 1S and lattice frame 50 and the spaces between the scintillators 1S. It is not absolutely necessary to drip the optical adhesive as long as the adhesive fills the spaces between the scintillators 1S and lattice frame 50 and the spaces between the scintillators 1S.

(6) In the foregoing embodiment, the liquid resin is defoamed when poured, but it is not necessary to defoam the liquid resin.

This invention may be embodied in other specific forms without departing from the spirit or essential attributes thereof and, accordingly, reference should be made to the appended claims, rather than to the foregoing specification, as indicating the scope of the invention.

What is claimed is:

1. A method of manufacturing a radiation detector having a scintillator array formed of a plurality of scintillators in a compact, two-dimensional arrangement, a light guide optically combined to said scintillator array, and a plurality of photomultiplier tubes smaller in number than said scintillators and optically combined to said light guide, said method comprising:

(A) a step of fabricating a lattice frame by combining a plurality of plate-like optical elements crosswise;

(B) a step of pouring a transparent liquid resin into a rectangular vessel for receiving said lattice frame, before or after placing said lattice frame in said rectangular vessel;

(C) a step of placing the scintillators in the rectangular vessel after placing the lattice frame in the rectangular vessel and pouring said liquid resin into a rectangular vessel; and (D) a step of removing from said rectangular vessel a cured resin object integrating the liquid resin having cured, the lattice frame and the scintillators, and contouring the resin object to make said scintillator array;

said steps (A)-(D) being executed to manufacture said scintillator array.

2. A method of manufacturing a radiation detector as defined in claim 1, wherein a release agent is applied to said rectangular vessel before executing said step (B) of pouring the transparent liquid resin into the rectangular vessel.

3. A method of manufacturing a radiation detector as defined in claim 1, wherein said liquid resin is defoamed when executing said step (B) of pouring the transparent liquid resin into the rectangular vessel.

4. A method of manufacturing a radiation detector as defined in claim 1, wherein said rectangular vessel is formed of fluororesin.

5. A method of manufacturing a radiation detector as defined in claim 1, wherein said rectangular vessel is formed of metal and has surfaces coated with fluororesin.

6. A method of manufacturing a radiation detector as defined in claim 5, wherein said metal is aluminum.

7. A method of manufacturing a radiation detector as defined in claim 5, wherein said metal is stainless steel.

8. A method of manufacturing a radiation detector as defined in claim 1, wherein said optical elements used for fabricating said lattice frame are light transmitting elements, said light transmitting elements being formed of positioning elements arranged at equal intervals at least on a plane of the scintillator array opposed to the light guide, and an optical adhesive for transmitting light, said positioning elements being positioning reflecting elements or positioning transparent films.

9. A method of manufacturing a radiation detector as defined in claim 1, wherein said optical adhesive is a silicone adhesive.

10. A method of manufacturing a radiation detector as defined in claim 1, wherein said optical adhesive is an epoxy adhesive.

* * * * *